United States Patent Office 3,770,660
Patented Nov. 6, 1973

3,770,660
CATALYST AND PROCESS FOR DOUBLE
BOND ISOMERIZATION
Donald C. Tabler, Bartlesville, Okla., assignor to
Phillips Petroleum Company
No Drawing. Filed Oct. 5, 1970, Ser. No. 78,209
Int. Cl. B01j 11/06, 11/82
U.S. Cl. 252—467                                    15 Claims

ABSTRACT OF THE DISCLOSURE

A catalyst comprised of a uranium oxide and an oxide of one of phosphorus, arsenic, antimony, or bismuth, on a support, is employed for double-bond isomerization of cycloalkadienes, alkenes, alkylcycloalkenes, alkadienes, and the like.

This invention relates to a composition of uranium oxide together with an oxide of a Group V–A element, on a support. In another aspect, this invention relates to a process for the isomerization of double bonds or cyclic and acyclic unsaturated compounds.

The shifting of the position of a double bond in an olefinic compound is a well-known phenomenon. Such an operation frequently is valuable in the conversion of an olefinic compound to one or more isomers thereof which may be less plentiful and more valuable. Olefinic compounds as a class are useful in themselves, such as for use as monomers to produce a wide variety of polymeric compositions, or for use as building blocks to prepare other still more valuable compounds.

A number of catalysts are known to be active for the shifting of double bonds in olefinic compounds. However, such double-bond isomerization is frequently accompanied by other and undesirable side reaction such as cracking, dehydrogenation, of polymerization, and the like. Silica-alumina, for example, possesses isomerization activity, but also, and undesirably, tends to produce other by-products, such as polymerized products, as well.

My invention provides a process using a class of catalysts which are highly active for the shifting of double bonds in olefinic hydrocarbons, thus converting olefinic hydrocarbons to one or more double-bond isomers, with good selectivity and with a minimum of undesirable by-products.

It is an object of my invention to provide a new group of isomerization catalysts. Another object of my invention is the use of such catalysts to effectuate the double-bond isomerization of unsaturated compounds.

Other aspects, objects, and the several advantages of my invention will be apparent to one skilled in the art to which it most nearly pertains from my description and appended claims here provided.

The catalysts of the present invention contain uranium, at least one Group V–A element as shown in the Periodic Table, Handbook of Chemistry and Physics, 49th ed. (1968), p. B–3, and a solid high surface area catalyst support. The Group V–A element can be arsenic, antimony, bismuth, or phosphorus.

Any suitable catalyst support, which will not otherwise interfere with the double-bond isomerization process of my invention, can be used. Some examples of suitable supports include the aluminas, such as eta, gamma, and the fluoride-compound treated aluminas; silica, silica-alumina, zirconia, titania, thoria, and their various combined forms; magnesium silicate, zinc aluminate, charcoal, kieselguhr; and the like; and mixtures thereof. To be suitable, such supports should have a surface area of at least about 1 square meter per gram of support.

The catalyst compositions can contain from 1 to 30, preferably from 2 ot 20, and more preferably 5 to 15, weight percent uranium, based upon the weight of the total composition. The catalysts also will contain sufficient arsenic, antimony, bismuth, or phosphorus to provide an atomic ratio of from 3:1 to 1:3 of uranium to such a Group V–A element. In addition to the support, the uranium, and the Group V–A element, the composition also can contain combined oxygen.

The catalyst compositions can be prepared in any suitable manner which is known in the catalyst art. For example, the support can be combined with suitable uranium compounds such as uranium dioxide or uranium trioxide, or with uranyl acetate or uranyl nitrate which are convertible to the oxide upon calcination, and with suitable Group V–A compounds such as arsenic trioxide or antimony trioxide, or with bismuth carbonate or phosphoric acid which are convertible to the oxide on calcination. This can be accomplished by dry blending, mixing, grinding, or ball milling of the suitable supports and compounds followed by calcination in air at elevated temperatures.

Still another, and preferred, method of preparation is to impregnate a suitable pellet, extrudate, or the like of one of the suitable support materials with an impregnating solution of soluble uranium-containing and soluble Group V–A element-containing compounds. The impregnating liquid can be either an aqueous or a non-aqueous medium depending upon the specific solubility of the compounds. For example, water is convenient for use in impregnating a support with a solution of uranium nitrate and arsenic acid. On the other hand, organic solvents such as benzene or cyclohexane are suitable when impregnating the support with compounds such as organo complexes of uranium and organo compounds of the Group V–A elements.

Whichever method of catalyst preparation is used, the catalytic composite is calcined in air at a temperature in the range of from 700 to 1200° F., preferably from 900 to 1000° F., for from 0.1 to 24 hours, to convert the uranium compound and the Group V–A compound to their respective oxides. Prior to or subsequent to such calcination, the catalyst acn be formed into desirable operating shapes such as pellets, extrudates, spheres, agglomerates, powder, or the like.

In some instances, it is beneficial to further treat the so-prepared catalyst composition with a hydrogen-containing gas at a temperature of from 500 to 1000° F., preferably from 700° to 900° F., for from 0.1 to 24 hours. Such hydrogen treatment frequently is beneficial when the catalyst is used in reactions involving the presence of free hydrogen. These catalyst compositions, after an interval of use, can be regenerated by procedures similar to those for activation as described above.

Feedstocks which can be converted according to the process of the present invention are double-bond isomerizable olefinic hydrocarbons. These can contain from 4 to 30 carbon atoms per molecule and from 1 to 4 double bonds per molecule. Such olefinic hydrocarbons can be either cyclic or acyclic, and the olefinic saturation can be either terminal or internal. Preferred olefinic hydrocarbons within this group are terminal monoolefins, non-conjugated polyenes, and diolefins having conjugated double bonds wherein the conjugated system is not centrally located in the molecule. The olefinic feed compound can contain cycloalkyl, aryl, or alkaryl substituents, but the total number of carbon atoms in such substituted olefinic molecules will not exceed about 30.

Some examples of suitable olefinic compounds include butene-1, butene-2, pentene-1, 3-octene, 6-para-tolylhexene-1, 2-methylheptene-3, 4-vinylcyclohexene, 1,5-cyclooctadiene, 1,5,9-cyclododecatriene, 1,3,7-octatriene, 1,3,5, 9-decatetraene, eicosene-1, 1-cyclohexylbutene-2, 4-phenylbutene-1, 1-methylcyclobutene, 1-methylcyclohexene, 5-cyclohexylpentene-1, 3-ethylcyclopentene, triacontene - 1, and the like, and mixtures thereof. The process of my invention has been found particularly useful for the isomerization of cyclic polyenes such as 1,5-cyclooctadiene and its alkyl derivatives, and the isomerization of alkenyl-substituted cycloolefins such as 4-vinylcyclohexene and its alkyl derivatives, of a molecular size as described above.

According to the process of my invention, in which I use the compositions of my invention as a catalyst, the feedstock is contacted with one of my catalysts, using any suitable conventional mode of contact in catalytic apparatus, at temperatures in the range of from 250 to 600° F., preferably from 400 to 500° F. The contacting can be carried out at any convenient pressure of from 0 to 2000 p.s.i.g., preferably of from 100 to 1000 p.s.i.g. The reaction can be carried out as a liquid, gaseous, or mixed phase operation; batchwise or continuously, though continuous reactions presently are preferred. Any rate of contact can be used which is sufficient to provide the degree of conversion desired. Generally, the feed rate will be in the range of from 0.1 to 10 LHSV, liquid volumes of feed per volume of catalyst per hour.

If desired, the olefinic feedstream can be diluted with an inert diluent. Such diluents can be, for example, saturated aliphatic hydrocarbons such as butane, pentane, cyclohexane, and the like, as well as mixtures thereof. The diluents generally should not exceed 30 carbon atoms per molecule.

Hydrogen can be introduced into the reaction zone together with the feedstock, if desired. Such method tends to prolong the activity of my catalysts and to extend the time between required regeneration of the catalysts. When hydrogen is used, it can be any convenient amount such as to provide a molar ratio of from 0.5:1 to 3:1 of hydrogen to olefinic feed, excluding diluent. The hydrogen further can contain a small quantity of carbon monoxide, if desired. A small amount of carbon monoxide, particularly when operating at higher pressures such as 0.5 to 5 volume percent based upon the volume of hydrogen, is sufficient to minimize any hydrogenation which might occur at these higher pressures.

My invention can be further understood and the scope of its effectiveness more fully realized from consideration of the following examples. Specific components and compounds utilized in these examples are intended to be illustrative and not limitative of my invention nor of the scope of the catalysts or the processes utilizing my catalysts.

EXAMPLE I

Example of method of preparation of a catalyst according to my invention

A uranium-arsenic-alumina catalyst was prepared. A uranium solution was prepared by dissolving 21.0 g. $UO(NO_3)_2 \cdot 6H_2O$ in 30 ml. $H_2O$. An arsenic solution was prepared by dissolving 4.0 g. of $H_3AsO_4$ in 20 ml. $H_2O$. These solutions then were combined. 90 g. of a commercial 10 to 20 mesh gamma-alumina support was impregnated with the combined solution of uranyl nitrate and arsenic acid. The clear impregnating solution was stirred with the alumina support and allowed to dry at room temperature for 3 days until all moisture had evaporated off. The composite was then calcined in flowing air at 900° F. for 1 hour. Analysis of the resulting catalyst composition showed that it contained 9.1 weight percent U and 2.0 weight percent As.

EXAMPLE II

Process of double-bond isomerization using my catalysts

A 50 cc., 54.7 g., portion of the above-prepared catalyst composition was charged into a tubular one-inch diameter fixed bed stainless steel reactor and was pretreated at 800° F. in a flow of hydrogen for about 15 hours. A feedstream containing 10 volume percent of 1,5-cyclooctadiene and 90 volumes percent cyclohexane as diluent then was passed over the pre-treated catalyst at a rate of 40 ml. liquid/hour together with a flow of hydrogen at 1 cubic foot of gas/hour measured at ambient conditions. The pressure was maintained at 100 p.s.i.g. and the temperature at 440° F. The essential conditions and the results of the test are shown as Run 1 in Table I below. A further run was carried out under somewhat differing conditions, and the results are shown in Table I below as Run 2.

TABLE I

|  | Run 1 | Run 2 |
|---|---|---|
| Temperature, ° F | 440 | 489 |
| Pressure, p.s.i.g | 100 | 100 |
| Feed rate, ml./hr | 40 | 60 |
| Hydrogen rate, ft.³/hr | 1.0 | ¹ 1.0 |
| Product Analysis, weight percent: ² | | |
| Cyclooctane | 3.32 | 3.72 |
| Cyclooctene | 6.17 | 2.54 |
| 1,3-cyclooctadiene | 80.32 | 90.94 |
| 1,4-cyclooctadiene | None | None |
| 1,5-cyclooctadiene | 10.19 | 2.81 |

¹ 1 volume percent CO in the hydrogen.
² Diluent-free basis.

That data in Table I show that the uranium-arsenic-alumina catalyst is highly active for the double bond isomerization of 1,5-cyclooctadiene to 1,3-cyclooctadiene. Although a substantial amount of hydrogen was present, there was relatively little hydrogenation, thus demonstrating the substantial selectivity of my catalysts.

EXAMPLE III

Process of double-bond isomerization using my catalysts

Using 50 ml. of the catalyst of Example I and the general procedure of Example II, 4-vinylcyclohexene was double bond isomerized by the process of my invention. The feed was 20 volume percent 4-vinylcyclohexene and 80 volume percent cyclohexane at a feed rate of 1 LHSV. Hydrogen, containing 1 volume percent CO, accompanied the feed at 1.5 cubic feet/hour measured at ambient conditions. The pressure was maintained at 200 p.s.i.g. and the temperature at 460° F. The analysis of the reactor effluent, on a diluent-free basis, was as follows, in weight percent.

TABLE II

| | |
|---|---|
| 4-vinylcyclohexene (4-VCH) | 23.69 |
| Ethylcyclohexenes | 23.47 |
| Cis- and trans-4-ethylidinecyclohexenes | 1.2 |
| Cis- and trans-3-ethylidinecyclohexenes | 25.97 |
| Other 4-VCH double bond isomers | 18.19 |
| Ethylbenzene | 7.42 |

The above analysis shows that the catalyst of my invention also is active for converting 4-vinylcyclohexene into a number of its double bond isomers.

Reasonable variations and modifications of my invention are possible within the scope of this disclosure, yet without departing from the scope and spirit thereof.

I claim:
1. A catalyst composition consisting essentially of uranium oxide and at least one oxide of phosphorus or bismuth on a support wherein said uranium oxide is present in a range of about 1 to 30 weight percent calculated as uranium, and said phosphorus or bismuth oxide is present in an atomic ratio of about 3:1 to 1:3 of uranium:phosphorus or bismuth.

2. The catalyst composition as defined in claim 1 wherein said support is a solid high surface area support having a surface area of at least 1 square meter per gram of said support.

3. The catalyst composition as defined in claim 2 wherein said uranium oxide is present in a range of from 2 to 20 weight percent expressed as uranium based on the total weight of said catalyst composition.

4. The catalyst composition as defined in claim 3 wherein said phosphorus or bismuth oxide is present in a weight ratio of about 9:2 of uranium:phosphorus or bismuth.

5. The catalyst composition as defined in claim 2 wherein said support is alumina, silica, silica-alumina, zirconia, titania, thoria, magnesium silicate, zinc aluminate, charcoal, kieselguhr, or mixtures thereof.

6. A method of preparing the catalyst composition as defined in claim 1 which comprises impregnating said support with an impregnating solution comprising soluble uranium-containing and soluble phosphorus or bismuth element-containing compounds in a solvent, removal of excess solvent from said impregnated support, and calcination of said impregnated support.

7. The method according to claim 6 wherein said calcined catalyst composition further is treated with a hydrogen-containing gas at from 500 to 1000° F. for from 0.1 to 24 hours.

8. A catalyst composition consisting essentially of molecular hydrogen-treated admixture of uranium oxide and arsenic oxide on a support, wherein the atomic ratio of uranium:arsenic is in a ratio of about 3:1 to 1:3, and said catalyst composition contains from about 1 to 30 weight percent uranium based on the weight of the total composition, said molecular hydrogen treatment being conducted at about 500 to 1000° F.

9. The catalyst composition as defined in claim 8 wherein said support is a solid high surface area support having a surface area of at least 1 square meter per gram of said support.

10. The catalyst composition as defined in claim 9 which contains about 2 to 20 weight percent uranium based on the total weight of said catalyst composition.

11. The catalyst composition as defined in claim 10 which contains a weight ratio of about 9:2 uranium:arsenic.

12. The catalyst composition as defined in claim 9 wherein said support is alumina, silica, silica-alumina, zirconia, titania, thoria, magnesium silicate, zinc aluminate, charcoal, kieselguhr, or mixtures thereof.

13. A method of preparing the catalyst composition as defined in claim 8 which comprises impregnating said support with an impregnating solution comprising soluble uranium-containing and soluble arsenic-containing compounds in a solvent, removal of excess solvent from said impregnated support, calcination of said impregnated support, and treatment thereof with a molecular hydrogen-containing gas at elevated temperature.

14. The method according to claim 13 wherein said treatment with said molecular hydrogen-containing gas is conducted at about 700 to 900° F. for about 0.1 to 24 hours.

15. The method according to claim 14 further incorporating treatment with carbon monoxide.

References Cited
UNITED STATES PATENTS

| | | | |
|---|---|---|---|
| 3,198,750 | 8/1965 | Callahan et al. | 252—467 X |
| 3,444,262 | 5/1969 | Heckelsberg | 260—683 D |
| 3,322,563 | 5/1967 | Moore | 252—437 X |
| 3,544,616 | 12/1970 | Grasselli et al. | 252—432 X |

PATRICK P. GARVIN, Primary Examiner

U.S. Cl. X.R.

252—435; 260—666 A